(12) United States Patent
Tong et al.

(10) Patent No.: US 8,542,473 B2
(45) Date of Patent: Sep. 24, 2013

(54) RESISTANCE DETERMINING SYSTEM AND METHOD FOR CIRCUIT PROTECTION

(75) Inventors: Song-Lin Tong, Shenzhen (CN); Qi-Yan Luo, Shenzhen (CN); Peng Chen, Shenzhen (CN)

(73) Assignees: Hong Fu Jin Precision Industry (ShenZhen) Co., Ltd., Taipei (TW); Hon Hai Precision Industry Co., Ltd., New Taipei (TW)

( * ) Notice: Subject to any disclaimer, the term of this patent is extended or adjusted under 35 U.S.C. 154(b) by 91 days.

(21) Appl. No.: 13/094,754

(22) Filed: Apr. 26, 2011

(65) Prior Publication Data
US 2012/0182660 A1    Jul. 19, 2012

(30) Foreign Application Priority Data
Jan. 4, 2011    (CN) .............................. 2011 1 008163

(51) Int. Cl.
*H02H 3/24*    (2006.01)
(52) U.S. Cl.
USPC .......................................................... 361/92
(58) Field of Classification Search
USPC .......................................................... 361/92
See application file for complete search history.

(56) References Cited

U.S. PATENT DOCUMENTS

| | | | | |
|---|---|---|---|---|
| 4,996,646 | A | * | 2/1991 | Farrington .................... 700/293 |
| 5,275,035 | A | * | 1/1994 | Baer .............................. 73/1.61 |
| 5,717,935 | A | * | 2/1998 | Zanders et al. ............... 713/300 |
| 2010/0259956 | A1* | | 10/2010 | Sadwick et al. ............... 363/50 |
| 2011/0175589 | A1* | | 7/2011 | Kurimoto ....................... 323/304 |

FOREIGN PATENT DOCUMENTS

WO    WO2010038476    *    4/2010

* cited by examiner

*Primary Examiner* — Jared Fureman
*Assistant Examiner* — Kevin J Comber
(74) *Attorney, Agent, or Firm* — Altis Law Group, Inc.

(57) ABSTRACT

A resistance determining system and method for a protection circuit, includes a resistance determining unit. The resistance determining unit interconnects a microcontroller and a digital resistor, where the microcontroller has first setting voltage corresponding to a first voltage threshold for activating the protection circuit, and the microcontroller is capable of receiving and converting a first external voltage input to the protection circuit to be a first converted voltage. The digital resistor includes a first variable resistor having two terminals connected to the respective first terminal and the second terminal. The microcontroller adjusts a resistance of the first variable resistor to be a first threshold resistance if the first converted voltage is substantially equal to the first voltage threshold, and the first resistance is determined to be substantially equal to the first threshold resistance.

8 Claims, 4 Drawing Sheets

RESISTANCE DETERMINING SYSTEM AND METHOD FOR CIRCUIT PROTECTION

BACKGROUND

1. Technical Field

The present disclosure relates to a resistance determining systems and methods, and particularly to a resistance determining system and method for determining resistances for circuit protection.

2. Description of Related Art

Power circuits for various electronic devices usually have protection circuits, such as an under voltage protection (UVP) circuit. When an input voltage is at an under voltage state, the UVP circuit controls the power circuits to turn off, and when an input voltage is at a recovered state, the power circuits can turn on. The UVP circuit needs resistors, usually called input resistors and responsive resistors, to support the its work at the under voltage state and at the voltage recovered state, respectively.

The resistances of the input resistor and the responsive resistor have to be determined in designing the UVP circuit. Typical methods usually manually change out different resistors in the UVP circuit to determine the proper resistors for the UVP circuit at the under voltage state and at the voltage recovered state, respectively; this method is inefficient.

What is needed, therefore, is a resistance determining system and method, which can overcome the above shortcomings.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present resistance determining system and method will now be described in detail below and with reference to the drawings.

Figure 1:
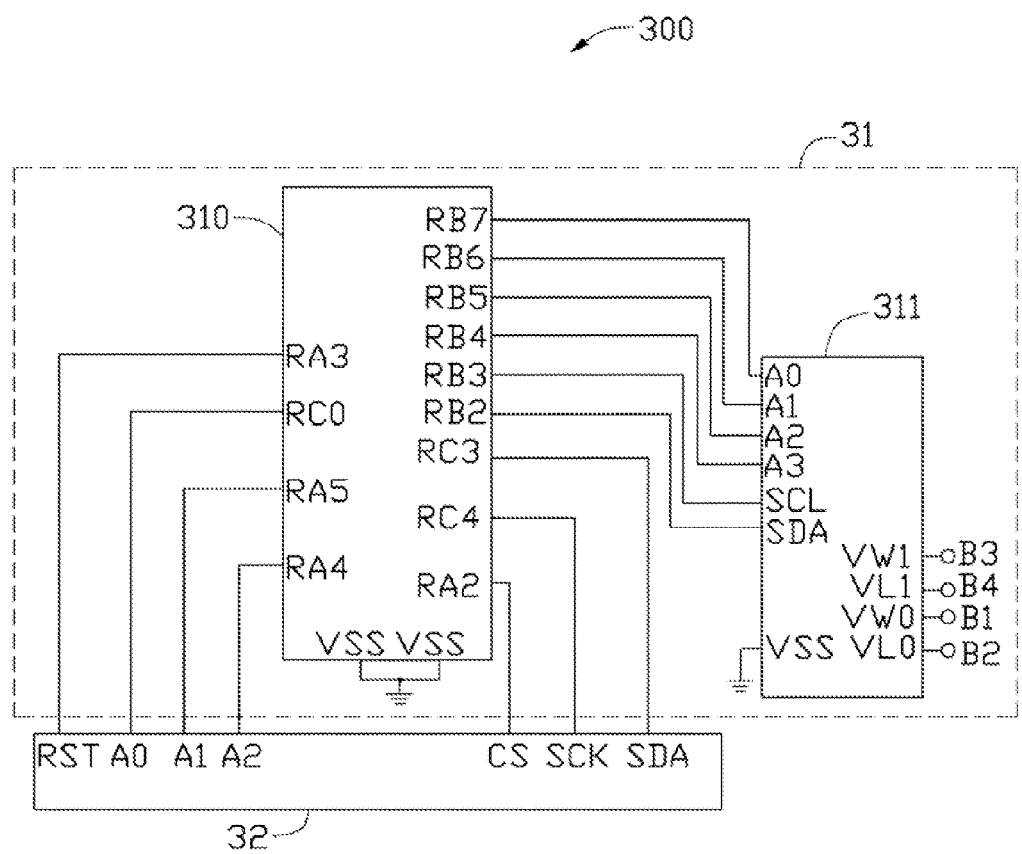
FIG. 1 is a circuit diagram showing one embodiment of a resistance determining system.

FIG. 1 is a circuit diagram showing one embodiment of a resistance determining system 300. The system 300 is configured to determine workable resistances for an under voltage protection (UVP) circuit 200 of a power circuit 100 (shown in FIG. 2). The workable resistances include a resistance of an input resistor 201 of the UVP circuit 200 at an under voltage state, and a resistance of a responsive resistor 202 of the UVP circuit 200 at a voltage recovered state.

Figure 2:
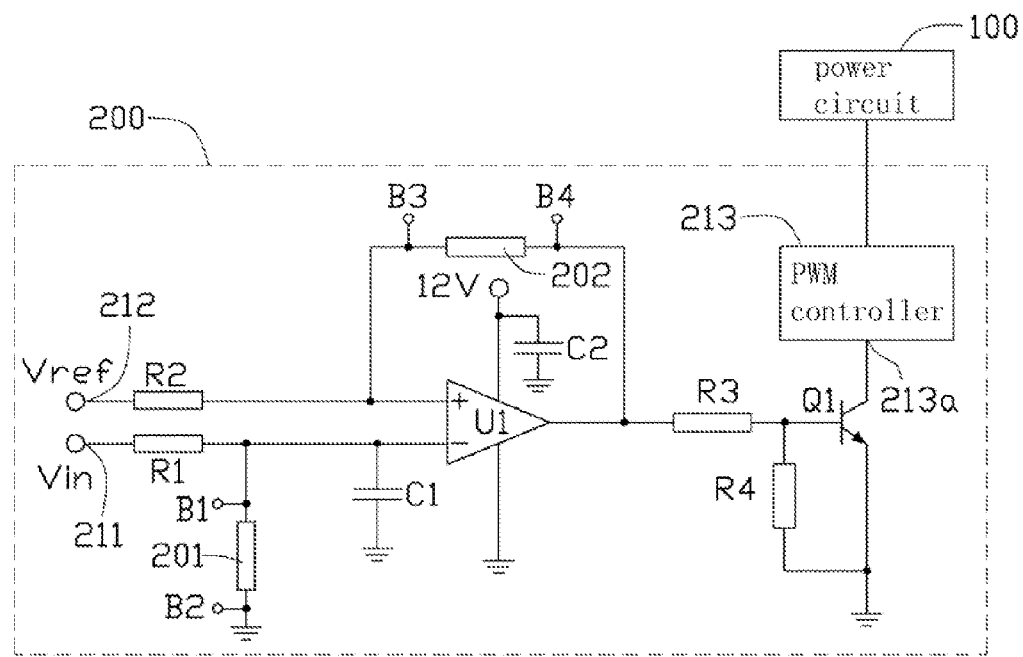
FIG. 2 is a circuit diagram of one embodiment of an under voltage protection (UVP) circuit of a power circuit.

Referring to FIG. 2, the UVP circuit 200 of the power circuit 100 includes a first voltage input end 211 connected to an external voltage Vin, a second voltage input end 212 connected to a reference voltage Vref. The UVP circuit 200 is configured to interconnect a first terminal B1 and a second terminal B2 nearest to the input resistor 201, a third terminal B3 and a fourth terminal B4 nearest to the responsive resistor 202, a PWM controller 213, a comparator U1, a bipolar junction transistor (BJT) Q1, a first resistor R1, a second resistor R2, a third resistor R3, a fourth resistor R4, a first capacitor C1 and a second capacitor C2. The PWM controller 213 is configured to control the power circuit 100 to turn on or turn off. In particular, the PWM controller 213 has a COMP leading pin 213a, when the COMP leading pin 213a is at a high voltage level, the PWM controller 213 controls the power circuit 100 to turn on, and when the COMP leading pin 213a is at a low voltage level, the PWM controller 213 controls the power circuit 100 to turn off. In the present embodiment, the reference voltage Vref is provided by a voltage stabilizing device in order to ensure the reference voltage Vref is a stabilized voltage.

The first input end 211 is electrically connected to an inverting input of the comparator U1 via the first resistor R1, and the second input end 212 is electrically connected to a positive input of the comparator U1 via the second resistor R2. A voltage input of the comparator U1 is connected to a 12V power supply. A base electrode of the BJT Q1 is connected to an output of the comparator U1 via the third resistor R3, an emitter electrode of the BJT Q1 is grounded, and a collector electrode of the BJT Q1 is connected to the COMP leading pin 213a. The base electrode and the emitter electrode of the BJT Q1 are interconnected by the fourth resistor R4. One end of the first capacitor C1 is electrically connected to the inverting input node of the comparator U1, and another end of the first capacitor C1 is connected to the ground. One end of the second capacitor C2 is electrically connected to the voltage input of the comparator U1, and the other end of the second capacitor C2 is connected to ground. The first terminal B1 is connected to the first resistor R1 and the inverting input of the comparator U1, and the second terminal B2 is connected to ground. The third terminal B3 is connected to the second resistor R2 and the positive input of the comparator U1, and the fourth terminal B4 is connected to the output of the comparator U1.

The UVP circuit workable resistor determining system 300 includes a resistance determining unit 31 and a display unit 32.

The resistance determining unit 31 includes a microcontroller 310 and a digital resistor 311. The microcontroller 310 includes a number of input/output terminals RB2-RB7, RA1-RA5 and RC0-RC4. In the present embodiment, the microcontroller 310 can be a PIC16F73 microcontroller. The microcontroller 310 has a first setting voltage and a second setting voltage. The first and second setting voltages are receivable voltages for the microcontroller 310 which correspond to an under voltage threshold at which the PWM controller 213 of the UVP circuit 200 should control the power circuit 100 to turn off. In addition, a recovered voltage threshold at which the PWM controller 213 of the UVP circuit 200 would control the power circuit 100 to turn on, respectively. The terminal RA1 of the microcontroller 310 is configured to receive the external voltage Vin and convert the external voltage Vin to be a first converted voltage and a second converted voltage applicable for the microcontroller 310, thereby preventing a too high external voltage Vin from directly inputting to the microcontroller 310.

The digital resistor 311 includes a first variable resistor, a second variable resistor, a number of input terminals A0-A3, clock terminal SCL and data terminal SDA. The first variable resistor has two terminals VW0 and VL0, the second variable resistor has two terminals VW1 and VL1. The terminals A0-A3 of the digital resistor 311 are connected to the terminals RB7-RB4 of the microcontroller 310, respectively. The clock terminal SCL of the digital resistor 311 is connected to the terminal RB3 of the microcontroller 310. The data terminal SDA is connected to the terminal RB2 of the microcontroller 310. The two terminals VW0, VL0 of the first variable resistor are connected to the first terminal B1 and the second B2. The two terminals VW1 and VL1 of the second variable resistor are connected to the third terminal B3 and the fourth terminal B4. In the present embodiment, the digital resistor 311 is X9241 digital resistor.

When the first converted voltage is substantially equal to the first setting voltage, the microcontroller 310 adjusts a resistance of the first variable resistor to be a first threshold resistance. At this time, the UVP circuit 200 controls the power circuit 100 to turn off. When the second converted voltage is substantially equal to the second setting voltage, the microcontroller 310 adjusts a resistance of the second variable resistor to be a second threshold resistance. At this time, the UVP circuit 200 controls the power circuit 100 to turn on.

The display unit 32 is configured to receive and display the first threshold resistance and the second threshold resistance obtained from the microcontroller 310. In the present embodiment, the display unit 32 includes input terminals SDA, SCK, CS, RST and A0-A2. In particular, the input terminal SDA is connected to the terminal RC3 of the microcontroller 310, the input terminal SCK is connected to the terminal RC4 of the microcontroller 310, the input terminal CS is connected to the terminal RA2 of the microcontroller 310, the input terminal RST is connected to the terminal RA3 of the microcontroller 310, the input terminal A0 is connected to the terminal RC0 of the microcontroller 310, the input terminal A1 is connected to the terminal RA5 of the microcontroller 310, and the input terminal A2 is connected to the terminal RA4 of the microcontroller 310.

In the UVP circuit 200, when the voltage of the inverting input of the comparator U1 is less the voltage of the positive input of the comparator U1, the BJT Q1 is turned on, and the COMP leading pin 213a is connected to the ground, the PWM controller 213 controls the power circuit 100 to turn off. When the voltage of the inverting input of the comparator U1 is greater than the voltage of the positive input of the comparator U1, the BJT Q1 is turned off, the COMP leading pin 213a remains at a high voltage level, the PWM controller 213 controls the power circuit 100 to turn on.

In application of the UVP circuit workable resistance determining system 300, when an under voltage is input as the external voltage Vin, the terminal RA1 of the microcontroller 310 receives and converts the external voltage Vin to be the first converted voltage. Then the first converted voltage is compared with the first setting voltage in the microcontroller 310, and if the first converted voltage is substantially equal to the first setting voltage, the microcontroller 310 adjusts the resistance of the first variable resistor to make sure the voltage of the inverting input node of the comparator U1 is less than the voltage of the positive input node of the comparator U1, such that the PWM controller 213 controls the power circuit 100 to turn off. At this time, the resistance of the first variable resistor is the first threshold resistance, the microcontroller 310 obtains the first threshold resistance, and the display unit 32 displays the first threshold resistance.

When a recovered voltage is input as the external voltage Vin, the terminal RA1 of the microcontroller 310 receives and converts the external voltage Vin to be the second converted voltage. Then the second converted voltage is compared with the second setting voltage in the microcontroller 310, and if the second converted voltage is substantially equal to the second setting voltage, the microcontroller 310 adjusts the resistance of the second variable resistor to make sure the voltage of the positive input node of the comparator U1 is less than the voltage of the inverting input node of the comparator U1, such that the PWM controller 213 controls the power circuit 100 to turn on. At this time, the resistance of the second variable resistor is the second threshold resistance, the microcontroller 310 obtains the second threshold resistance, and the display unit 32 displays the second threshold resistance.

Figure 3:
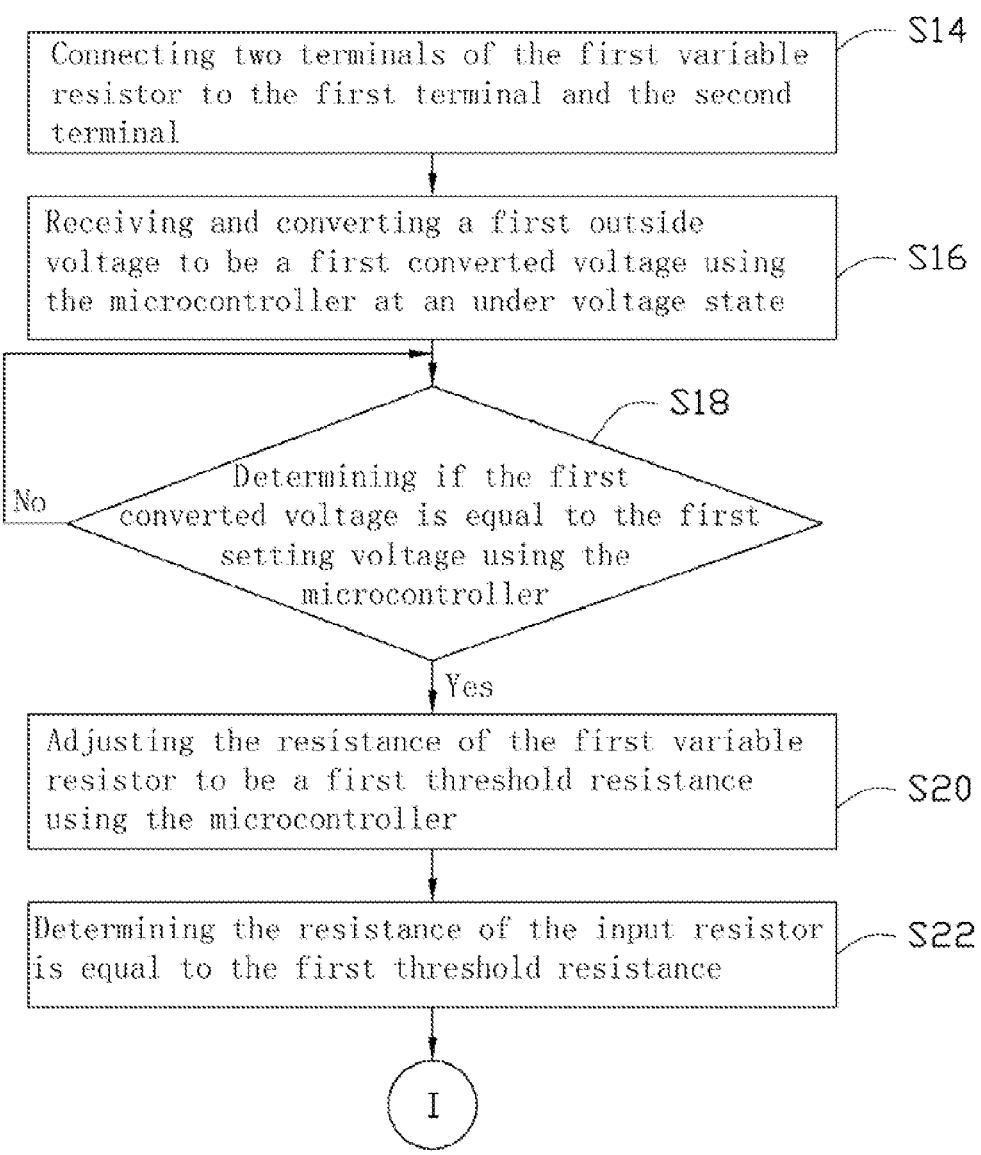
FIGS. 3 and 4 are flowcharts of a method for determining resistances for the UVP circuit of FIG. 2.
Figure 4:
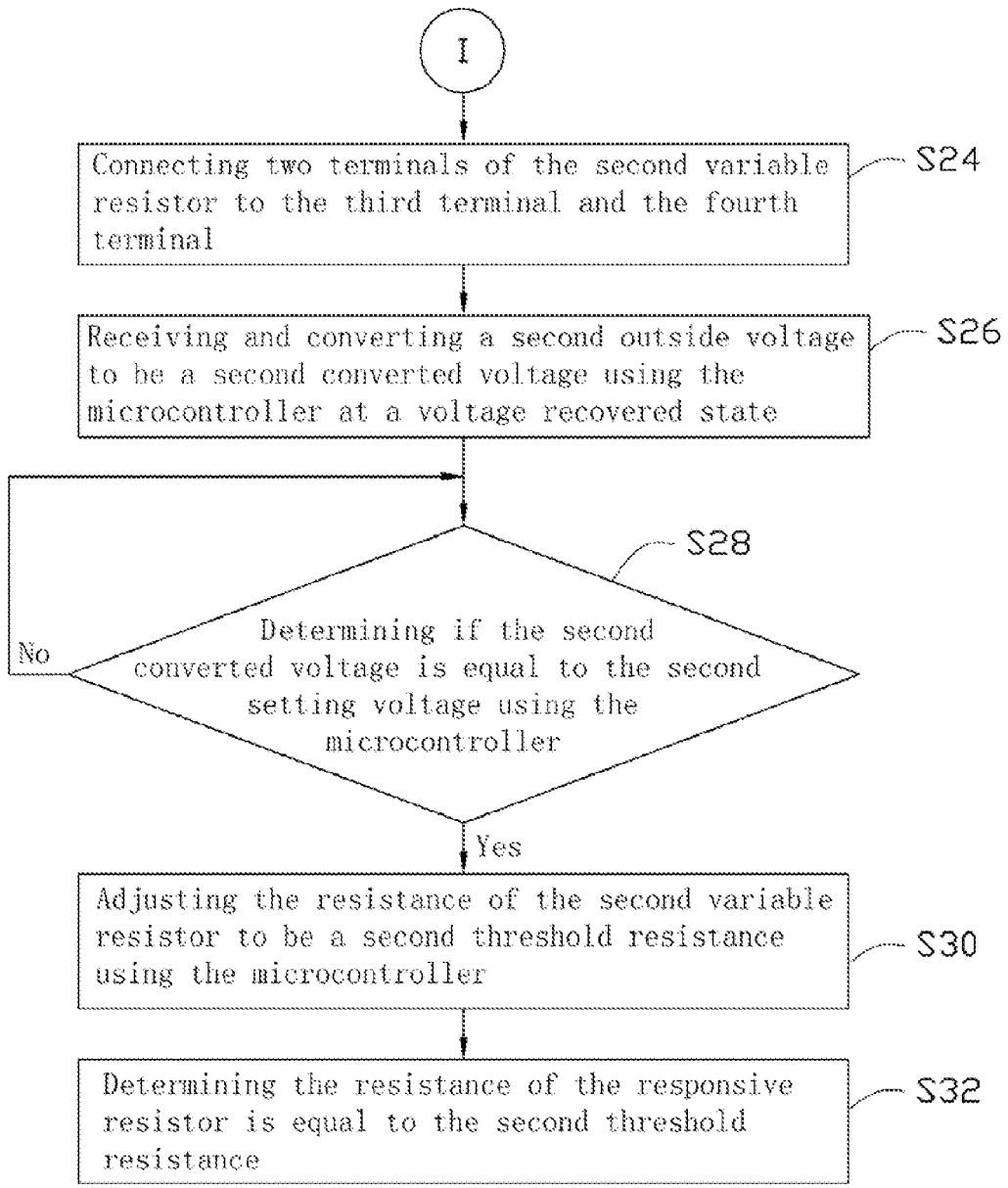

FIGS. 3 and 4 are flowcharts of a method for determining resistances for the UVP circuit 200 of FIG. 2. The resistances to be determined includes a resistance of an input resistor 201 of the UVP circuit 200 at a under voltage state, and a resistance of a responsive resistor 202 of the UVP circuit 200 at a voltage recovered state. The method includes the following steps.

In step S14: two terminals VW0 and VL0 of the first variable resistor are connected to the first terminal B1 and the second terminal B2.

In step S16: at an under voltage state, the microcontroller 310 receives and converts a first external voltage Vin to a first converted voltage.

In step S18: the microcontroller 310 compares the first converted voltage with the first setting voltage.

In step S20: if the first converted voltage is substantially equal to the first setting voltage, the microcontroller 310 adjusts the resistance of the first variable resistor to be a first threshold resistance, and the digital resistor 311 gives the first threshold resistance.

If the first converted voltage is not substantially equal to the first setting voltage, it can go back to step S16.

In step S22: the resistance of the input resistor 201 is determined to be substantially equal to the first threshold resistance.

In step S24: two terminals VW1 and VL1 are connected to the third terminal B3 and the fourth terminal B4.

In step S26: at a voltage recovered state, the microcontroller 310 receives and converts a second external voltage Vin to be a second converted voltage.

In step S28: the microcontroller 310 compares the second converted voltage with the second setting voltage.

In step S30: if the second converted voltage is substantially equal to the second setting voltage, the microcontroller 310 adjusts the resistance of the second variable resistor to a second threshold resistance, and the digital resistor 311 shows the second threshold resistance.

If the second converted voltage is not substantially equal to the second setting voltage, it can go back to step S26.

In step S32: the resistance of the responsive resistor 202 is determined to be substantially equal to the second threshold resistance.

It is understood that once the first and second setting voltages are reset, the resistance determining system and method are also applicable in determining resistances for other protection circuits, such as over voltage protection.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A resistance determining system for a protection circuit, the protection circuit having a first terminal and a second terminal for receiving a first resistance used in activating the protection circuit, the system comprising:
   a resistance determining unit, the resistance determining unit comprising:
      a microcontroller having a first setting voltage corresponding to a first voltage threshold for activating the protection circuit, the microcontroller receiving and converting a first external voltage input to the protection circuit to be a first converted voltage; and a digital resistor connected to the microcontroller, the digital resistor comprising a first variable resistor having two terminals connected to the first terminal and the second terminal, respectively, the microcontroller adjusting a resistance of the first variable resistor to be a first threshold resistance to activate the protection circuit when the first converted voltage is equal to the first voltage threshold, and the first resistance of the protection circuit being determined to be equal to the first threshold resistance.

2. The system of claim 1, wherein the protection circuit further has a third terminal and a fourth terminal for receiving a second resistance used in turning off the protection circuit, the microcontroller further has a second setting voltage corresponding to a second voltage threshold for turning off the protection circuit, the microcontroller further receives and converts a second external voltage input to the protection circuit to be a second converted voltage, the digital resistor further comprises a second variable resistor having two terminals connected to the third terminal and the fourth terminal, respectively, the microcontroller further adjusts a resistance of the second variable resistor to be a second threshold resistance to turn off the protection circuit when the second converted voltage is equal to the second voltage threshold, and the second resistance of the protection circuit is determined to be equal to the second threshold resistance.

3. The system of claim 2, further comprising a display unit connected to the resistance determining unit, the display unit displaying the first and second threshold resistances.

4. The system of claim 2, wherein the protection circuit comprises a comparator, a BJT, and a PWM controller, the comparator has an inverting input node connected to the first resistance, a positive input node connected to the second resistance, and an output node, the BJT has a base electrode connected to the output node of the comparator, an emitter electrode connected to the ground, and a collector electrode, the PWM controller has a COMP leading pin connected to the collector electrode of the BJT, and the PWM controller is further connected to a power circuit.

5. The system of claim 4, wherein the protection circuit is an under voltage protection circuit, the first external voltage is obtained at an under voltage state, and the second external voltage is obtained at a voltage recovered state.

6. A resistance determining method for a protection circuit, the protection circuit having a first terminal and a second terminal for receiving a first resistance used in activating the protection circuit, the method comprising:

providing a resistance determining unit comprising a microcontroller and a digital resistor connected to the microcontroller, the microcontroller having a first setting voltage corresponding to a first voltage threshold for activating the protection circuit, the digital resistor comprising a first variable resistor having two terminals;

connecting the two terminals of the first variable resistor to the first and second terminals;

receiving and converting a first external voltage input to the protection circuit to be a first converted voltage using the microcontroller;

comparing the first converted voltage with the first setting voltage using the microcontroller;

adjusting a resistance of the first variable resistor to be a first threshold resistance using the microcontroller when the first converted voltage is equal to the first setting voltage; and determining the resistance of the first resistance as being equal to the first threshold resistance.

7. The method of claim 6, wherein the protection circuit further has a third terminal and a fourth terminal for receiving a second resistance used in turning off the protection circuit, the microcontroller further has a second setting voltage corresponding to a second voltage threshold for turning off the protection circuit, the digital resistor further has a second variable resistor having two terminals, the method further comprising:

connecting the two terminals of the second variable resistor to the third and fourth terminals;

receiving and converting a second external voltage input to the protection circuit to be a second converted voltage using the microcontroller;

comparing the second converted voltage with the second setting voltage using the microcontroller;

adjusting a resistance of the second variable resistor to be a second threshold resistance using the microcontroller when the second converted voltage is equal to the second setting voltage; and determining the resistance of the second resistance as being equal to the second threshold resistance.

8. The method of claim 7, wherein the protection circuit is an under voltage protection circuit, the first external voltage is obtained at an under voltage state, and the second external voltage is obtained at a voltage recovered state.

* * * * *